(12) United States Patent
Okano et al.

(10) Patent No.: US 8,517,476 B2
(45) Date of Patent: Aug. 27, 2013

(54) BRAKE CONTROLLER, BRAKE CONTROL SYSTEM, AND BRAKE CONTROL METHOD

(75) Inventors: Takahiro Okano, Toyota (JP); Eiji Nakamura, Miyoshi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 304 days.

(21) Appl. No.: 13/058,745

(22) PCT Filed: Aug. 11, 2009

(86) PCT No.: PCT/IB2009/006503
§ 371 (c)(1),
(2), (4) Date: Feb. 11, 2011

(87) PCT Pub. No.: WO2010/018440
PCT Pub. Date: Feb. 18, 2010

(65) Prior Publication Data
US 2011/0148185 A1   Jun. 23, 2011

(30) Foreign Application Priority Data
Aug. 11, 2008   (JP) .................................. 2008-207426

(51) Int. Cl.
*B60T 8/66* (2006.01)
(52) U.S. Cl.
USPC ........................... 303/167; 303/20; 303/119.1
(58) Field of Classification Search
USPC .................. 303/167, 20, 116.1–116.3, 119.1, 303/119.2, 87, 155, 157, 158, 166
See application file for complete search history.

(56) References Cited

U.S. PATENT DOCUMENTS

| 7,055,916 B2 * | 6/2006 | Inoue .......................... 303/116.1 |
| 2006/0181143 A1 | 8/2006 | Yamamoto |
| 2008/0106143 A1 | 5/2008 | Yazaki et al. |

FOREIGN PATENT DOCUMENTS

| CN | 1683195 A | 10/2005 |
| DE | 199 35 371 | 2/2001 |
| EP | 0 437 752 | 7/1991 |
| EP | 1 693 263 | 8/2006 |
| JP | 2000 025598 | 1/2000 |
| JP | 2005 297780 | 10/2005 |
| JP | 2006 027453 | 2/2006 |
| JP | 2007 326381 | 12/2007 |

OTHER PUBLICATIONS

International Search Report issued Dec. 2, 2009 in PCT/IB09/006503 filed Aug. 11, 2009.
Office Action issued Jun. 8, 2010 in Japanese Patent Application No. 2008-207426 filed Aug. 11, 2008 (with partial English language translation).

(Continued)

Primary Examiner — Pamela Rodriguez
(74) Attorney, Agent, or Firm — Oblon, Spivak, McClelland, Maier & Neustadt, L.L.P.

(57) ABSTRACT

A brake controller reduces a hydraulic pressure applied to a wheel cylinder by opening or closing a pressure-reducing linear control valve, a regulator cut valve, and a master cut valve arranged in a hydraulic circuit. A brake ECU detects a state of a vehicle, estimates a degree of influence of noise due to reduction in wheel cylinder pressure on the vehicle on the basis of the detected state of the vehicle, and then selects any of the electromagnetic valves, that is, the pressure-reducing linear control valve, the regulator cut valve and the master cut valve, to reduce the wheel cylinder pressure on the basis of the estimated result.

13 Claims, 5 Drawing Sheets

(56) References Cited

OTHER PUBLICATIONS

Office Action issued Feb. 4, 2013 in Chinese Patent Application No. 200980130940.X (Partial English Translation only).

* cited by examiner

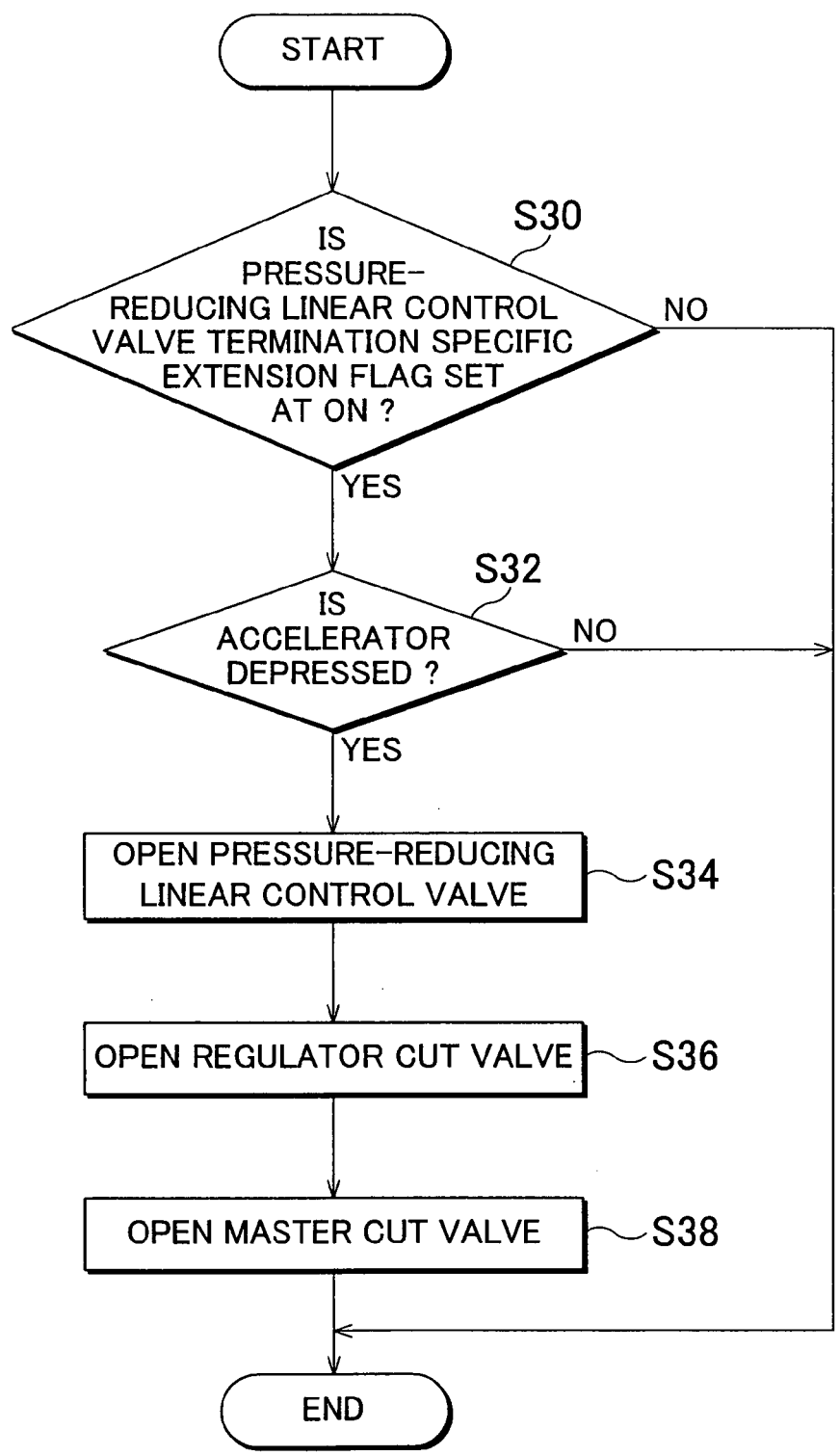

BRAKE CONTROLLER, BRAKE CONTROL SYSTEM, AND BRAKE CONTROL METHOD

BACKGROUND OF THE INVENTION

1. Field of the Invention

The invention relates to a brake controller, brake control system and brake control method that control a braking force applied to drive wheels provided for a vehicle.

2. Description of the Related Art

In recent years, an electronically controlled brake system is widely employed as a braking system for a vehicle (see Japanese Patent Application Publication No. 2006-27453 (JP-A-2006-27353)). The electronically controlled brake system controls a braking force applied to each drive wheel so as to apply an optimal braking force to the vehicle in accordance with a running condition of the vehicle.

Such an electronically controlled brake system includes pressure-increasing linear control valves and pressure-reducing linear control valves in passages of brake fluid. A hydraulic pressure difference between the upstream side and downstream side of each of these pressure-increasing linear control valves and pressure-reducing linear control valves is linearly controlled with respect to an electric current supplied. Each of the linear control valves is a linear valve that is able to selectively control a wheel cylinder pressure, which is a hydraulic pressure applied to a wheel cylinder. Each of the linear control valves is able to continuously vary the wheel cylinder pressure by changing an electric current supplied thereto.

Each pressure-increasing linear control valve is provided between a power hydraulic pressure source and the corresponding wheel cylinder. Each pressure-increasing linear control valve controls the hydraulic pressure of the power hydraulic pressure source and supplies the hydraulic pressure to the corresponding wheel cylinder to increase the wheel cylinder pressure. Each pressure-reducing linear control valve is provided between a reservoir and the corresponding wheel cylinder. Each pressure-reducing linear control valve controls a drain of brake fluid from the corresponding wheel cylinder to the reservoir to decrease the wheel cylinder pressure.

In the electronically controlled brake system, as a brake pedal is depressed, a target hydraulic pressure of each wheel cylinder is set on the basis of a master cylinder pressure generated by the depression, electric currents supplied to the pressure-increasing linear control valves or the pressure-reducing linear control valves are determined so as to obtain the target hydraulic pressure applied to each wheel cylinder, and then the pressure-increasing linear control valves or the pressure-reducing linear control valves are opened to increase or decrease the wheel cylinder pressures. Then, as the depression of the brake pedal is released, electric currents are supplied to the pressure-reducing linear control valves. Then, the pressure-reducing linear control valves are opened for a predetermined period of time to drain the brake fluid in the wheel cylinders to the reservoir. Thus, the remaining pressures become zero.

Incidentally, in the electronically controlled brake system, electric currents supplied to the above described pressure-increasing linear control valves and pressure-reducing linear control valves are normally controlled through pulse width modulation (PWM) control by an electronic control unit (ECU). However, this PWM control generates high-frequency switching noise. The noise is hardly audible to an occupant of a vehicle because road noise is large when the vehicle is running. On the other hand, when the vehicle is stopped or running at an extremely low speed, road noise is small, so the high-frequency noise may be audible to the occupant. Particularly, in the above described control executed to eliminate the remaining pressures after the depression of the brake pedal is released, there is a possibility that the occupant feels uncomfortable against noise generated when the pressure-reducing linear control valves are opened.

SUMMARY OF THE INVENTION

The invention provides a brake controller, brake control system and brake control method that are able to improve quietness in a vehicle cabin by suppressing noise generated when hydraulic pressures applied to wheel cylinders are increased or reduced.

A first aspect of the invention relates to a brake controller that opens or closes a plurality of valves, which are arranged in a circuit that supplies a hydraulic pressure to a wheel cylinder, so as to vary the hydraulic pressure. The brake controller includes: vehicle state detecting means that detects a state of a vehicle; estimating means that estimates a degree of influence of noise on the vehicle, generated in accordance with the variation in the hydraulic pressure, on the basis of the detected state of the vehicle; and selecting means that selects the valve to be opened or closed from among the plurality of valves on the basis of the estimated degree of influence of noise on the vehicle.

With the above configuration, it is possible to vary a hydraulic pressure by selecting an appropriate valve in consideration of the influence of noise, caused by the variation in hydraulic pressure applied to the wheel cylinder, on the vehicle. By so doing, noise may be favorably suppressed, so it is possible to improve comfort in a vehicle cabin.

In the brake controller according to the above aspect, the plurality of valves may include a first valve and a second valve, wherein noise generated by opening or closing the second valve is smaller than that of the first valve, and the valve selected by the selecting means may be the second valve when the degree of influence of noise on the vehicle, estimated by the estimating means, is larger than a predetermined reference value. With the above configuration, when the influence of noise is large, the second valve, which causes less noise, is selected to suppress noise. Thus, it is possible to improve comfort in the vehicle cabin.

In the brake controller according to the above aspect, the vehicle state detecting means may include vehicle speed detecting means that detects a vehicle speed, and, when the vehicle speed detected by the vehicle speed detecting means is lower than a predetermined reference speed, the estimating means may estimate that the degree of influence of noise on the vehicle is larger than a predetermined reference value. When the vehicle is stopped or the vehicle is running at an extremely low speed, the vehicle cabin is quieter than that during regular running, so noise due to variation in hydraulic pressure is noticeable. With the above configuration, when the vehicle speed is lower than the predetermined reference speed, it is estimated that the degree of influence of noise on the vehicle is larger than a predetermined reference value, and then the second valve, which causes less noise when opened or closed, is selected to vary the hydraulic pressure. Thus, it is possible to improve comfort in the vehicle cabin.

In the brake controller according to the present aspect, the second valve may be a valve of which a flow rate at which brake fluid passes through the valve is lower with respect to the same hydraulic pressure than that of the first valve. Generally, as the flow rate at which brake fluid passes through the valve reduces with respect to the same hydraulic pressure, noise due to pressure variation reduces. Thus, with the above configuration, the second valve is a valve of which a flow rate at which brake fluid passes through the valve is lower with respect to the same hydraulic pressure than that of the first valve. Thus, it is possible to further suppress noise when the second valve is selected to vary the hydraulic pressure.

In the brake controller according to the present embodiment, the vehicle state detecting means may include hydraulic pressure detecting means that detects a hydraulic pressure applied to the wheel cylinder and operation detecting means that detects an operation state of a brake operating member by a driver, and the selecting means may compare the hydraulic pressure applied to the wheel cylinder at the time when braking of the vehicle ends in accordance with the detected hydraulic pressure applied to the wheel cylinder and the detected operation state of the brake operating member with a predetermined first reference hydraulic pressure, and then select the valve to be opened or closed on the basis of the compared result. With the above configuration, when the remaining pressure in the wheel cylinder is lower than a predetermined reference hydraulic pressure, the influence of heating, or the like, due to a drag on the vehicle is small. Thus, by suppressing noise prior to a pressure variation response characteristic, it is possible to further improve comfort in the vehicle cabin.

In the brake controller according to the present aspect, the valve selected by the selecting means may be the first valve when the hydraulic pressure applied to the wheel cylinder is higher than a predetermined second reference hydraulic pressure that is higher than the first reference hydraulic pressure. When the remaining pressure in the wheel cylinder is higher than the second reference hydraulic pressure, the influence of heating due to a drag is large. In such a case, with the above configuration, it is possible to responsively reduce the hydraulic pressure to suppress heating.

The brake controller according to the present aspect may further include: braking start determination hydraulic pressure detecting means that detects a braking start determination reference hydraulic pressure based on which it is determined whether braking of the vehicle is started; and braking start determination means that determines whether braking of the vehicle is started by comparing the detected braking start determination reference hydraulic pressure with a predetermined braking start determination reference hydraulic pressure, wherein the braking start determination reference hydraulic pressure may be higher than the second reference hydraulic pressure, and, when the braking that is determined to be started ends, the selecting means may select the valve to be opened or closed. With the above configuration, the braking start determination reference hydraulic pressure is higher than the second reference hydraulic pressure, it is possible to prevent a situation that braking start determination is made because of the remaining pressure.

The brake controller according to the present aspect may further include acceleration request detecting means that detects an acceleration request for the vehicle, wherein the selecting means may select the first valve when the acceleration request detecting means detects the acceleration request. When there is an acceleration request, for example, engine noise, or the like, increases, so noise generated when the valve is opened or closed is masked. Thus, with the above configuration, in this case, by selecting the first valve of which the flow rate at which brake fluid passes through the valve is higher with respect to the same hydraulic pressure, it is possible to promptly reduce the remaining pressure as compared with the second valve. Hence, it is possible to quickly carry out acceleration.

The brake controller according to the present aspect may further include: maximum hydraulic pressure detecting means that detects a maximum value of the hydraulic pressure applied to the wheel cylinder during braking; and remaining pressure estimating means that estimates likelihood of remaining pressure in the wheel cylinder on the basis of the result detected by the maximum hydraulic pressure detecting means, wherein the selecting means may select the valve to be opened or closed on the basis of the likelihood of remaining pressure estimated by the remaining pressure estimating means. With the above configuration, it is not necessary to detect a hydraulic pressure in a hydraulic circuit when braking is released, so it is possible to promptly select the valve.

When the hydraulic pressure is reduced from a state where the hydraulic pressure in the wheel cylinder is low, it is less likely that the remaining pressure will be left in the wheel cylinder. Thus, the second valve is selected to preferentially suppress noise that is generated when the valve is opened or closed. On the other hand, when the hydraulic pressure is reduced from a state where the hydraulic pressure in the wheel cylinder is high, it is highly likely that the remaining pressure will be left in the wheel cylinder. Thus, the first valve is selected to quickly reduce the remaining pressure. In this way, by selecting the valve for reducing hydraulic pressure on the basis of the result estimated by the remaining pressure estimating means, it is possible to quickly reduce the remaining pressure in the wheel cylinder.

The brake controller according to the present aspect may further include operation speed detecting means that detects an operation speed at which a brake operating member is operated, wherein the selecting means may select the valve to be opened or closed by comparing the operation speed with a predetermined reference operation speed to select the valve to be opened or closed. With the above configuration, it is not necessary to detect a hydraulic pressure in a hydraulic circuit when braking is released, so it is possible to promptly select the valve.

When the speed at which the brake operating member is returned is low at the time when the wheel cylinder pressure is reduced, it is less likely that the remaining pressure will be left. Thus, the second valve is selected to preferentially suppress noise that is generated when the valve is opened or closed. On the other hand, because a period of time until braking is stopped is short when the brake operating member is returned at a high speed, it is likely that the remaining pressure will be left. Thus, in this case, the first valve is selected to quickly reduce the remaining pressure. In this way, by selecting the valve for reducing hydraulic pressure on the basis of the speed at which the brake operating member is operated, it is possible to quickly reduce the remaining pressure in the wheel cylinder.

A second aspect of the invention relates to a brake control system. The brake control system includes: a first wheel cylinder that applies a braking force to a first drive wheel; a second wheel cylinder that applies a braking force to a second drive wheel that is different from the first drive wheel; a power hydraulic pressure source that is able to increase a hydraulic pressure by being supplied with power; a master cylinder that supplies brake fluid to the first wheel cylinder through a master flow passage in accordance with an operation amount by which a brake operating member is operated; a regulator that supplies brake fluid to the second wheel cylinder through a regulator flow passage in accordance with the operation amount by which the brake operating member is operated; a master cut valve that is a normally open electromagnetic valve provided in the master flow passage; a regulator cut valve that is a normally open electromagnetic valve provided in the regulator flow passage; a power hydraulic pressure source flow passage that provides fluid communication between the first and second wheel cylinders and the power hydraulic pressure source; a pressure-increasing linear control valve that is a normally closed electromagnetic valve provided in the power hydraulic pressure source flow passage and that increases a hydraulic pressure applied to the first and second wheel cylinders by adjusting an opening degree of the pressure-increasing linear control valve; a pressure-reducing linear control valve that is a normally closed electromagnetic valve provided in the power hydraulic pressure source flow passage and that reduces the hydraulic pressure applied to the first and second wheel cylinders by adjusting an opening degree of the pressure-reducing linear control valve; and an electric current control unit that controls supply of electric current for driving the master cut valve, the regulator cut valve, the pressure-increasing linear control valve and the pressure-reducing linear control valve, wherein, when a vehicle speed is lower than or equal to a predetermined reference speed, the electric current control unit prohibits adjustment of the opening degree of the pressure-increasing linear control valve or the opening degree of the pressure-reducing linear control valve, and controls the supply of electric current so that a pressure of brake fluid supplied to the first and second wheel cylinders is varied by adjusting an opening degree of the regulator cut valve or an opening degree of the master cut valve.

With the above configuration, when the vehicle is stopped or the vehicle is running at an extremely low speed in which the vehicle speed is lower than or equal to a predetermined reference speed, the hydraulic pressure is varied through the regulator cut valve or the master cut valve, which causes less noise when opened or closed to suppress noise. Thus, it is possible to improve comfort in the vehicle cabin.

A third aspect of the invention relates to a brake control method that includes opening or closing a first valve and a second valve, which are arranged in a circuit that supplies a hydraulic pressure to a wheel cylinder, so as to vary the hydraulic pressure. The brake control method includes: when the hydraulic pressure is lower than a predetermined value, prohibiting the first valve from opening or closing, and opening or closing the second valve, wherein noise generated when only the first valve out of the first valve and the second valve is opened or closed is larger than noise generated when only the second valve out of the first valve and the second valve is opened or closed, and a rate of change in the hydraulic pressure when only the first valve out of the first valve and the second valve is opened or closed is higher than a rate of change in the hydraulic pressure when only the second valve out of the first valve and the second valve is opened or closed.

The brake control method according to the present aspect may further include, when the hydraulic pressure is lower than a predetermined value and a rotational speed of a drive wheel that is braked with an increase in the hydraulic pressure is lower than or equal to a predetermined reference speed, prohibiting the first valve from opening or closing, and opening or closing the second valve.

In the brake control method according to the present aspect, the first valve may be an electromagnetically driven valve that is driven by an electric current supplied thereto through PWM control, and the second valve may be an electromagnetically driven valve that is driven by an electric current supplied thereto through on-off control.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 4 is a flowchart that illustrates a process executed in parallel with the process shown in FIGS. 3A and 3B.

DETAILED DESCRIPTION OF EMBODIMENTS

Hereinafter, an embodiment of the invention will be described in details with reference to the accompanying drawings.

Figure 1:
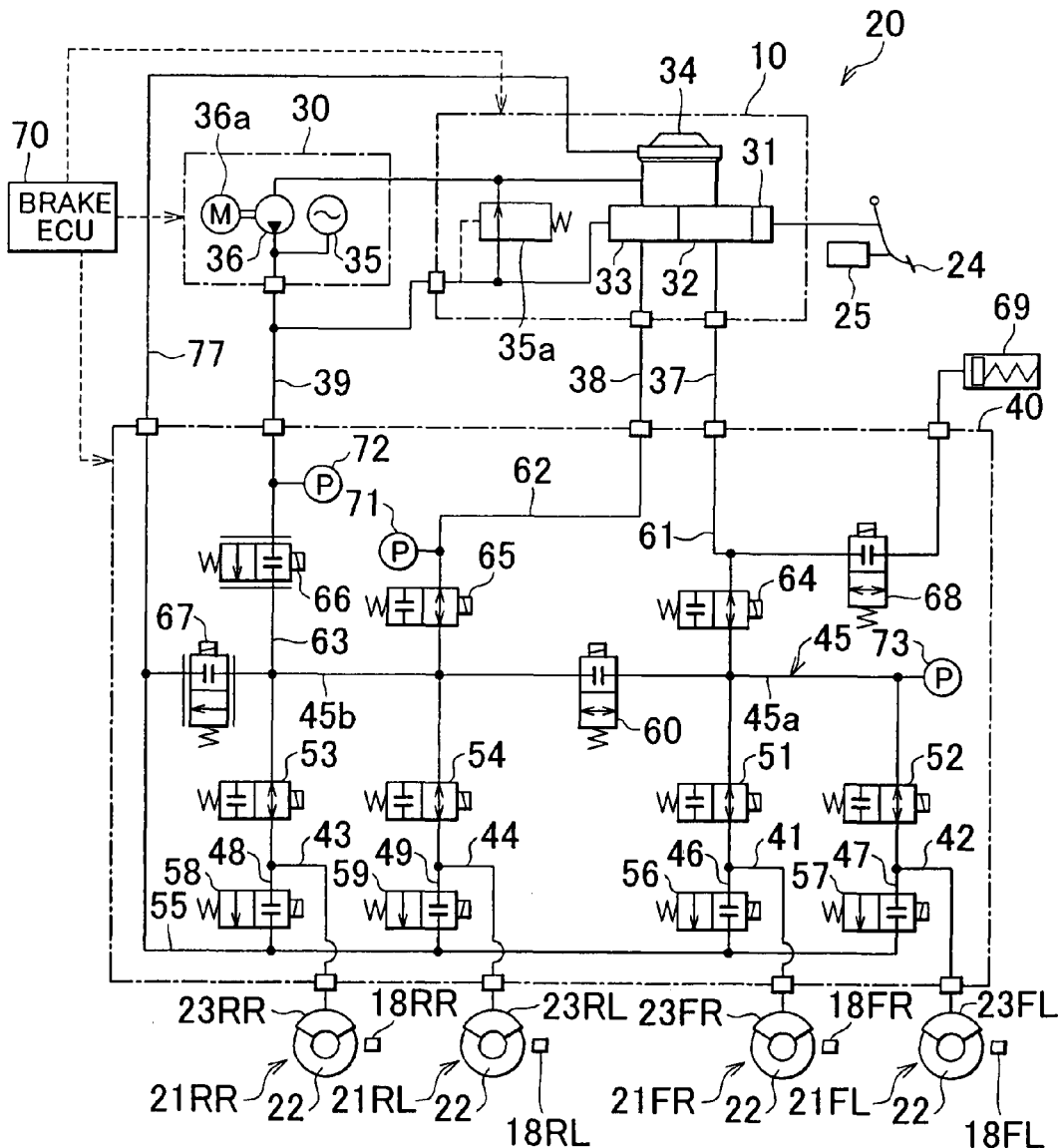
FIG. 1 is a line diagram that shows a brake controller according to an embodiment of the invention.

FIG. 1 is a line diagram that shows a brake controller 20 according to the embodiment of the invention. The brake controller 20 shown in the above drawing constitutes an electronically controlled brake system (ECB) for a vehicle, and controls braking forces applied to four drive wheels (not shown) provided for the vehicle.

As shown in FIG. 1, the brake controller 20 includes disk brake units 21FR, 21FL, 21RR and 21RL, a master cylinder unit 10, a power hydraulic pressure source 30, and a hydraulic pressure actuator 40. The disk brake units 21FR, 21FL, 21RR and 21RL are braking force apply mechanisms provided respectively for drive wheels.

The disk brake units 21FR, 21FL, 21RR and 21RL respectively apply braking forces to a right front wheel, left front wheel, right rear wheel and left rear wheel of the vehicle. The master cylinder unit 10 feeds brake fluid, which is pressurized in accordance with an operation amount of a brake pedal 24 by a driver, to the disk brake units 21FR to 21RL. The master cylinder unit 10 serves as a manual hydraulic pressure source. The brake pedal 24 serves as a brake operating member. The power hydraulic pressure source 30 is able to feed brake fluid, which serves as hydraulic fluid pressurized by being supplied with power, to the disk brake units 21FR to 21RL independently of driver's operation of the brake pedal 24. The hydraulic pressure actuator 40 appropriately adjusts the hydraulic pressure of brake fluid supplied from the power hydraulic pressure source 30 or the master cylinder unit 10 and feeds the brake fluid to the disk brake units 21FR to 21RL. By so doing, braking forces applied to the drive wheels by hydraulic pressure braking are adjusted. In the present embodiment, a wheel cylinder pressure control system is formed to include the power hydraulic pressure source 30 and the hydraulic pressure actuator 40.

The disk brake units 21FR to 21RL, the master cylinder unit 10, the power hydraulic pressure source 30 and the hydraulic pressure actuator 40 will be described in greater detail below. The disk brake units 21FR to 21RL respectively include brake disks 22 and wheel cylinders 23FR to 23RL. The wheel cylinders 23FR to 23RL are incorporated in respective brake calipers. Then, the wheel cylinders 23FR to 23RL each are connected to the hydraulic pressure actuator 40 via respective different flow passages. Note that, hereinafter, the wheel cylinders 23FR to 23RL are collectively referred to as "wheel cylinders 23" where appropriate.

In each of the disk brake units 21FR to 21RL, as brake fluid is supplied from the hydraulic pressure actuator 40 to the wheel cylinder 23, a brake pad, which serves as a friction member, is pressed against the brake disk 22 that rotates integrally with the drive wheel. By so doing, a braking force is applied to each drive wheel. Note that the disk brake units 21FR to 21RL are used in the present embodiment; instead, other braking force apply mechanisms, each of which includes a wheel cylinder 23 such as a drum brake, may be used.

In the present embodiment, the master cylinder unit 10 is a master cylinder with a hydraulic pressure booster, and includes a hydraulic pressure booster 31, a master cylinder 32, a regulator 33 and a reservoir 34. The hydraulic pressure booster 31 is connected to the brake pedal 24. The hydraulic pressure booster 31 multiplies the pedal pressure exerted on the brake pedal 24 and then transmits the multiplied pedal pressure to the master cylinder 32. Brake fluid is supplied from the power hydraulic pressure source 30 to the hydraulic pressure booster 31 via the regulator 33 to multiply the pedal pressure. Then, the master cylinder 32 generates a master cylinder pressure having a predetermined multiplication factor with respect to a pedal pressure.

The reservoir 34 is arranged upstream of the master cylinder 32 and the regulator 33. The reservoir 34 stores brake fluid. The master cylinder 32 is in fluid communication with the reservoir 34 when depression of the brake pedal 24 is released. On the other hand, the regulator 33 is in fluid communication with both the reservoir 34 and an accumulator 35 of the power hydraulic pressure source 30. The regulator 33 uses the reservoir 34 as a low-pressure source and uses the accumulator 35 as a high-pressure source. The regulator 33 generates a hydraulic pressure that is substantially equal to the master cylinder pressure. Hereinafter, the hydraulic pressure in the regulator 33 is referred to as "regulator pressure" where appropriate.

The power hydraulic pressure source 30 includes the accumulator 35 and a pump 36. The accumulator 35 converts pressure energy of brake fluid pressurized by the pump 36 into pressure energy of filler gas, such as nitrogen, for example, to about 14 to 22 MPa and then accumulates the pressure energy. The pump 36 includes a motor 36a, which serves as a driving source. The inlet port of the pump 36 is connected to the reservoir 34, while the discharge port of the pump 36 is connected to the accumulator 35. In addition, the accumulator 35 is also connected to a relief valve 35a provided for the master cylinder unit 10. As the pressure of brake fluid in the accumulator 35 increases to, for example, about 25 MPa, the relief valve 35a opens to return the high-pressure brake fluid to the reservoir 34.

As described above, the brake controller 20 includes the master cylinder 32, the regulator 33 and the accumulator 35 as a source for supplying brake fluid to the wheel cylinders 23. Then, a master line 37 is connected to the master cylinder 32, a regulator line 38 is connected to the regulator 33, and an accumulator line 39 is connected to the accumulator 35. These master line 37, regulator line 38 and accumulator line 39 each are connected to the hydraulic pressure actuator 40.

The hydraulic pressure actuator 40 includes an actuator block and a plurality of electromagnetic valves. A plurality of flow passages are formed in the actuator block. The flow passages formed in the actuator block includes individual flow passages 41, 42, 43 and 44 and a main flow passage 45. The individual flow passages 41 to 44 are respectively branched off from the main flow passage 45, and are connected to the wheel cylinders 23FR, 23FL, 23RR and 23RL of the corresponding disk brake units 21FR, 21FL, 21RR and 21RL. By so doing, each of the wheel cylinders 23 is communicable with the main flow passage 45.

In addition, antilock brake system (ABS) holding valves 51, 52, 53 and 54 are respectively provided midway of the individual flow passages 41, 42, 43 and 44. The ABS holding valves 51 to 54 each include a solenoid and a spring. The solenoid is on-off controlled. Each of the ABS holding valves 51 to 54 is a normally open electromagnetic valve that is open when the solenoid is in a non-conductive state. When the ABS holding valves 51 to 54 are open, the ABS holding valves 51 to 54 allow brake fluid to bidirectionally flow. That is, the ABS holding valves 51 to 54 allow brake fluid to flow from the main flow passage 45 to the wheel cylinders 23, and also allow brake fluid to flow back from the wheel cylinders 23 to the main flow passage 45. As the solenoids are energized to close the ABS holding valves 51 to 54, flow of brake fluid through the individual flow passages 41 to 44 is interrupted.

Furthermore, the wheel cylinders 23 are connected to a reservoir flow passage 55 through pressure-reducing flow passages 46, 47, 48 and 49 that are respectively connected to the individual flow passages 41 to 44. ABS pressure-reducing valves 56, 57, 58 and 59 are provided midway of the pressure-reducing flow passages 46, 47, 48 and 49. The ABS pressure-reducing valves 56 to 59 each include a solenoid and a spring. The solenoid is on-off controlled. Each of the ABS pressure-reducing valves 56 to 59 is a normally closed electromagnetic valve that is closed when the solenoid is in a non-conductive state. When the ABS pressure-reducing valves 56 to 59 are closed, flow of brake fluid through the pressure-reducing flow passages 46 to 49 is interrupted. As the solenoids are energized to open the ABS pressure-reducing valves 56 to 59, brake fluid is allowed to flow through the pressure-reducing flow passages 46 to 49. Thus, brake fluid returns from the wheel cylinders 23 to the reservoir 34 through the pressure-reducing flow passages 46 to 49 and the reservoir flow passage 55. Note that the reservoir flow passage 55 is connected to the reservoir 34 of the master cylinder unit 10 through a reservoir line 77.

A separation valve 60 is provided midway of the main flow passage 45. Owing to the separation valve 60, the main flow passage 45 is partitioned into a first flow passage 45a and a second flow passage 45b. The first flow passage 45a is connected to the individual flow passages 41 and 42. The second flow passage 45b is connected to the individual flow passages 43 and 44. The first flow passage 45a is connected to the front wheel-side wheel cylinders 23FR and 23FL via the individual flow passages 41 and 42. The second flow passage 45b is connected to the rear wheel-side wheel cylinders 23RR and 23RL via the individual flow passages 43 and 44.

The separation valve 60 includes a solenoid and a spring. The solenoid is on-off controlled. The separation valve 60 is a normally closed electromagnetic valve that is closed when the solenoid is in a non-conductive state. When the separation valve 60 is closed, flow of brake fluid through the main flow passage 45 is interrupted. As the solenoid is energized to open the separation valve 60, brake fluid is allowed to flow bidirectionally between the first flow passage 45a and the second flow passage 45b.

In addition, in the hydraulic pressure actuator 40, a master flow passage 61 and a regulator flow passage 62 are formed so as to be in fluid communication with the main flow passage 45. More specifically, the master flow passage 61 is connected to the first flow passage 45a of the main flow passage 45. The regulator flow passage 62 is connected to the second flow passage 45b of the main flow passage 45. In addition, the master flow passage 61 is connected to the master line 37 that is in fluid communication with the master cylinder 32. The regulator flow passage 62 is connected to the regulator line 38 that is in fluid communication with the regulator 33.

A master cut valve 64 is provided midway of the master flow passage 61. The master cut valve 64 includes a solenoid and a spring. The solenoid is on-off controlled. The master cut valve 64 is a normally open electromagnetic valve that is open when the solenoid is in a non-conductive state. When the master cut valve 64 is open, the master cut valve 64 allows brake fluid to bidirectionally flow between the master cylinder 32 and the first flow passage 45a of the main flow passage 45. As the solenoid is energized to close the master cut valve 64, flow of brake fluid through the master flow passage 61 is interrupted.

In addition, a stroke simulator 69 is connected to the master flow passage 61 upstream of the master cut valve 64 via a simulator cut valve 68. That is, the simulator cut valve 68 is provided in a flow passage that connects the master cylinder 32 to the stroke simulator 69. The simulator cut valve 68 includes a solenoid and a spring. The solenoid is on-off controlled. The simulator cut valve 68 is a normally closed electromagnetic valve that is closed when the solenoid is in a non-conductive state. When the simulator cut valve 68 is closed, flow of brake fluid between the master flow passage 61 and the stroke simulator 69 is interrupted. As the solenoid is energized to open the simulator cut valve 68, brake fluid is allowed to bidirectionally flow between the master cylinder 32 and the stroke simulator 69.

The stroke simulator 69 includes a plurality of pistons and springs. The stroke simulator 69 generates reactive force in accordance with force depressing the brake pedal 24 by the driver when the simulator cut valve 68 is open. The stroke simulator 69 has multi-stage spring characteristics in order to improve driver's brake operation feeling. However, in the embodiment of the invention, the stroke simulator need not to have multi-stage spring characteristics.

A regulator cut valve 65 is provided midway of the regulator flow passage 62. The regulator cut valve 65 also includes a solenoid and a spring. The solenoid is on-off controlled. The regulator cut valve 65 is a normally open electromagnetic valve that is opened when the solenoid is in a non-conductive state. When the regulator cut valve 65 is open, the regulator cut valve 65 allows brake fluid to bidirectionally flow between the regulator 33 and the second flow passage 45b of the main flow passage 45. As the solenoid is energized to close the regulator cut valve 65, flow of brake fluid through the regulator flow passage 62 is interrupted.

In the present embodiment, as described above, the master cylinder 32 of the master cylinder unit 10 is in fluid communication with the front wheel-side wheel cylinders 23FR and 23FL by a first line that is formed of the following elements. The first line is formed of the master line 37, the master flow passage 61, the master cut valve 64, the first flow passage 45a of the main flow passage 45, the individual flow passages 41 and 42, and the ABS holding valves 51 and 52. In addition, the hydraulic pressure booster 31 and regulator 33 of the master cylinder unit 10 are in fluid communication with the rear wheel-side wheel cylinders 23RR and 23RL by a second line that is formed of the following elements. The second line is formed of the regulator line 38, the regulator flow passage 62, the regulator cut valve 65, the second flow passage 45b of the main flow passage 45, the individual flow passages 43 and 44 and the ABS holding valves 53 and 54.

Thus, a hydraulic pressure in the master cylinder unit 10, which is pressurized in accordance with a driver's brake operation amount, is transmitted to the front wheel-side wheel cylinders 23FR and 23FL via the first line. In addition, the hydraulic pressure in the master cylinder unit 10 is transmitted to the rear wheel-side wheel cylinders 23RR and 23RL via the second line. By so doing, the wheel cylinders 23 are able to generate a braking force in accordance with the driver's brake operation amount.

An accumulator flow passage 63 is also formed in the hydraulic pressure actuator in addition to the master flow passage 61 and the regulator flow passage 62. One end of the accumulator flow passage 63 is connected to the second flow passage 45b of the main flow passage 45, and the other end of the accumulator flow passage 63 is connected to the accumulator line 39 that is in fluid communication with the accumulator 35.

A pressure-increasing linear control valve 66 is provided midway of the accumulator flow passage 63. In addition, the accumulator flow passage 63 and the second flow passage 45b of the main flow passage 45 are connected to the reservoir flow passage 55 via a pressure-reducing linear control valve 67. Each of the pressure-increasing linear control valve 66 and the pressure-reducing linear control valve 67 includes a linear solenoid and a spring, and is a normally closed electromagnetic valve that is closed when the solenoid is in a non-conductive state. In each of the pressure-increasing linear control valve 66 and the pressure-reducing linear control valve 67, the opening degree of the valve is adjusted in proportion to an electric current supplied to the solenoid.

The pressure-increasing linear control valve 66 is provided as a common pressure-increasing control valve for the plurality of wheel cylinders 23 provided in correspondence with the drive wheels. In addition, similarly, the pressure-reducing linear control valve 67 is also provided as a common pressure-reducing control valve for the wheel cylinders 23. That is, in the present embodiment, the pressure-increasing linear control valve 66 and the pressure-reducing linear control valve 67 are provided as a pair of common control valves that feed or drain hydraulic fluid, fed from the power hydraulic pressure source 30, to or from the wheel cylinders 23.

Note that, here, a differential pressure between the inlet and outlet of the pressure-increasing linear control valve 66 corresponds to a differential pressure between a pressure of brake fluid in the accumulator 35 and a pressure of brake fluid in the main flow passage 45, and a differential pressure between the inlet and outlet of the pressure-reducing linear control valve 67 corresponds to a differential pressure between a pressure of brake fluid in the main flow passage 45 and a pressure of brake fluid in the reservoir 34. In addition, where an electromagnetic driving force according to an electric power supplied to the linear solenoid of the pressure-increasing linear control valve 66 or the pressure-reducing linear control valve 67 is F1, the urging force of the spring is F2, and a differential pressure acting force according to a differential pressure between the inlet and outlet of the pressure-increasing linear control valve 66 or the pressure-reducing linear control valve 67 is F3, the relationship F1+F3=F2 is established. Thus, by continuously controlling an electric power supplied to the linear solenoid of the pressure-increasing linear control valve 66 or the pressure-reducing linear control valve 67, a differential pressure between the inlet and outlet of the pressure-increasing linear control valve 66 or the pressure-reducing linear control valve 67 may be controlled.

In the present embodiment, a pressure control mechanism is formed of the power hydraulic pressure source 30, the pressure-increasing linear control valve 66 and the pressure-reducing linear control valve 67. The pressure control mechanism is operated to control the hydraulic pressure applied to each wheel cylinder 23. The second flow passage 45b of the main flow passage 45 is in fluid communication between the pressure-increasing linear control valve 66 and the pressure-reducing linear control valve 67, so the pressure control mechanism is able to control the hydraulic pressure applied to each of the rear wheel-side wheel cylinders 23RR and 23RL irrespective of whether the separation valve 60 is open or closed. When the separation valve 60 is open, the pressure control mechanism is operated to make it possible to control the hydraulic pressures applied to all the wheel cylinders 23.

In the brake controller 20, the power hydraulic pressure source 30 and the hydraulic pressure actuator 40 are controlled by a brake ECU 70. The brake ECU 70 is an example of control means according to the aspect of the invention. The brake ECU 70 is formed of a microprocessor that includes a CPU. The brake ECU 70 further includes a ROM that stores various programs, a RAM that temporarily stores data, an input/output port, a communication port, and the like, in addition to the CPU. Then, the brake ECU 70 is communicable with a host hybrid ECU (not shown), or the like. The brake ECU 70 controls the pump 36 of the power hydraulic pressure source 30 and the electromagnetic valves 51 to 54, 56 to 59, 60, 64 to 68 that constitute the hydraulic pressure actuator 40 on the basis of control signals from the hybrid ECU and signals from various sensors. Thus, the brake ECU 70 is able to execute brake control.

In addition, a regulator pressure sensor 71, an accumulator pressure sensor 72 and a control pressure sensor 73 are connected to the brake ECU 70. The regulator pressure sensor 71 detects a pressure of brake fluid in the regulator cut flow passage 62 at a portion upstream of the regulator cut valve 65, that is, a regulator pressure, and supplies a signal that indicates the detected value to the brake ECU 70. The accumulator pressure sensor 72 detects a pressure of brake fluid in the accumulator flow passage 63 at a portion upstream of the pressure-increasing linear control valve 66, that is, an accumulator pressure, and supplies a signal that indicates the detected value to the brake ECU 70. The control pressure sensor 73 detects a pressure of brake fluid in the first flow passage 45a of the main flow passage 45, and supplies a signal that indicates the detected value to the brake ECU 70. The detected values of the pressure sensors 71 to 73 are sequentially supplied to the brake ECU 70 at predetermined time intervals, and are stored and held in a predetermined area of the brake ECU 70 in units of predetermined amounts.

When the separation valve 60 is open to allow fluid communication between the first flow passage 45a and second flow passage 45b of the main flow passage 45, the output value of the control pressure sensor 73 indicates the low-pressure-side hydraulic pressure of the pressure-increasing linear control valve 66 and also indicates the high-pressure-side hydraulic pressure of the pressure-reducing linear control valve 67. Thus, the output value may be used to control the pressure-increasing linear control valve 66 and the pressure-reducing linear control valve 67. In addition, when both the pressure-increasing linear control valve 66 and the pressure-reducing linear control valve 67 are closed and the master cut valve 64 is open, the output value of the control pressure sensor 73 indicates a master cylinder pressure. Furthermore, when the separation valve 60 is open to allow fluid communication between the first flow passage 45a and second flow passage 45b of the main flow passage 45, and when the ABS holding valves 51 to 54 are open while the ABS pressure-reducing valves 56 to 59 are closed, the output value of the control pressure sensor 73 indicates a hydraulic fluid pressure applied to each wheel cylinder 23, that is, a wheel cylinder pressure.

In addition, the sensors connected to the brake ECU 70 include a stroke sensor 25 provided for the brake pedal 24. The stroke sensor 25 detects a pedal stroke, which is an operation amount of the brake pedal 24, and then supplies a signal that indicates the detected value to the brake ECU 70. The output value of the stroke sensor 25 is also sequentially supplied to the brake ECU 70 at predetermined time intervals, and is stored and held in a predetermined area of the brake ECU 70 in units of predetermined amounts. Note that brake operation state detecting means other than the stroke sensor 25 may be provided in addition to the stroke sensor 25 or instead of the stroke sensor 25, and connected to the brake ECU 70. The brake operation state detecting means may be, for example, a pedal pressure sensor that detects an operation force of the brake pedal 24 or a brake switch that detects that the brake pedal 24 is depressed.

In addition, wheel speed sensors 18FR, 18FL, 18RR and 18RL are connected to the brake ECU 70. The wheel speed sensors 18FR, 18FL, 18RR and 18RL respectively detect wheel speeds of the right front wheel, left front wheel, right rear wheel and left rear wheel. Hereinafter, the wheel speed sensors 18FR, 18FL, 18RR and 18RL are collectively referred to as "wheel speed sensors 18" where appropriate. The wheel speed sensors 18 each detect a vehicle speed. The wheel speed sensors 18 are an example of vehicle state detecting means according to the aspect of the invention. In addition, a vehicle speed sensor that directly detects a vehicle speed may be provided in addition to or instead of the wheel speed sensors 18.

In the thus configured brake controller 20, as the driver depresses the brake pedal 24, the brake ECU 70 calculates a target deceleration of the vehicle on the basis of the pedal stroke and the master cylinder pressure. Then, the brake ECU 70 calculates a target hydraulic pressure of each wheel cylinder 23 on the basis of the calculated target deceleration, and then determines electric currents supplied to the pressure-increasing linear control valve 66 and the pressure-reducing linear control valve 67 so that the wheel cylinder pressure attains the target hydraulic pressure. As a result, brake fluid is supplied from the power hydraulic pressure source 30 to the wheel cylinders 23 via the pressure-increasing linear control valve 66 to apply braking force to each drive wheel. Note that at this time, the brake ECU 70 opens the separation valve 60 to allow brake fluid to be supplied from the power hydraulic pressure source 30 to the front wheel side, while the brake ECU 70 closes the master cut valve 64 and the regulator cut valve 65 to interrupt supply of brake fluid, which is fed from the master cylinder 32 and the regulator 33, to the main flow passage 45.

Figure 2:
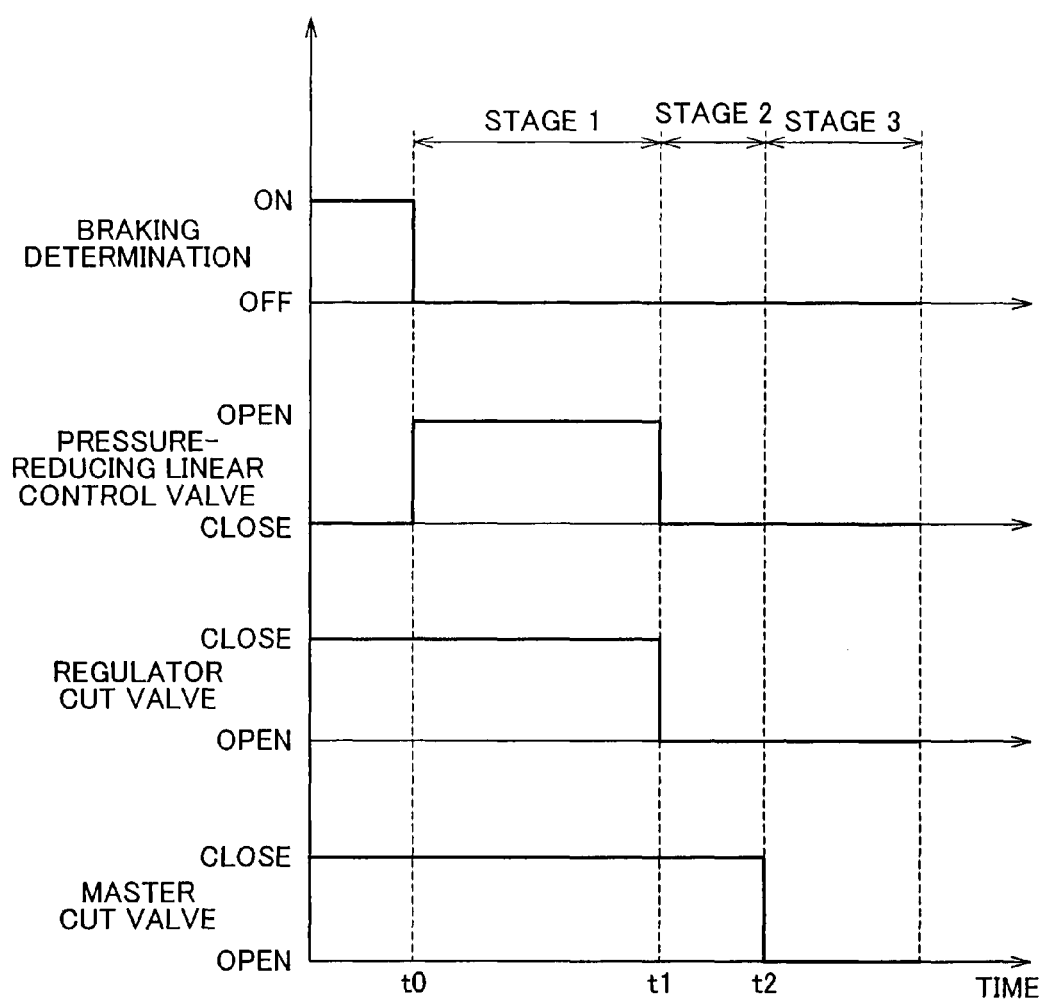
FIG. 2 is a time chart that illustrates termination specific control in the brake controller.

FIG. 2 is a time chart that illustrates termination specific control in the brake controller 20. As shown in FIG. 2, the abscissa axis represents time, and the ordinate axis represents, from the upper side, on/off of braking determination, open/close of the pressure-reducing linear control valve 67, close/open of the regulator cut valve 65 and close/open of the master cut valve 64.

The "termination specific control" is executed after depression of the brake pedal 24 is released in order to prevent the remaining pressure from being left in the wheel cylinders 23. When the brake pedal 24 is returned slowly at the time when depression of the brake pedal 24 is released, the wheel cylinder pressure Pfr is substantially zero at the time when braking is stopped. Thus, almost no remaining pressure is left in each wheel cylinder 23. However, when the brake pedal 24 is steeply returned, braking stops before each wheel cylinder pressure becomes zero in hydraulic pressure control. Thus, the remaining pressure is left in the wheel cylinders 23. In addition, because of tolerance of the control pressure sensor 73 that detects a wheel cylinder pressure, although the wheel cylinder pressure indicated by the control pressure sensor 73 is substantially zero, the remaining pressure may be actually left. Thus, the termination specific control is necessary. By executing the termination specific control to eliminate the remaining pressure applied to the wheel cylinders 23, it is possible to prevent a drag of the brake.

The brake ECU 70 makes a braking determination as to whether braking should be performed on the basis of the regulator pressure from the regulator pressure sensor 71. The regulator pressure sensor 71 detects the hydraulic pressure based on which it is determined whether to start braking. The regulator pressure sensor 71 is an example of braking start determination hydraulic pressure detecting means according to the aspect of the invention. Specifically, the brake ECU 70 compares the regulator pressure with a predetermined braking start determination reference hydraulic pressure. Then, when the regulator pressure is higher than the braking start determination reference hydraulic pressure, it is determined to start braking (turn on braking). On the other hand, when the regulator pressure is lower than or equal to the braking start determination reference hydraulic pressure, it is determined to stop braking (turn off braking). Braking determination may be made on the basis of the master cylinder pressure detected by the control pressure sensor 73. In addition, braking determination may be made on the basis of the pedal stroke from the stroke sensor 25. In this case, for example, when the pedal stroke is larger than a predetermined amount, it may be determined to turn on braking, whereas, when the pedal stroke is smaller than or equal to the predetermined amount, it may be determined to turn off braking. In FIG. 2, it is determined to turn off braking at time t0.

FIG. 2 shows a normal termination specific control. In this normal termination specific control, when it is determined turn off braking at time t0, the brake ECU 70 opens the pressure-reducing linear control valve 67 for a predetermined period of time until time t1 (this stage is termed stage 1). During the stage 1, almost all the brake fluid remaining in the wheel cylinders 23 is drained to the reservoir 34 via the reservoir flow passage 55 and the reservoir line 77.

After that, at time t1, the pressure-reducing linear control valve 67 is closed, and the regulator cut valve 65, which has been closed till then, is opened (this stage is termed stage 2). After that, at time t2, the master cut valve 64, which has been closed till then, is opened (this stage is termed stage 3). Through these stage 2 and stage 3, brake fluid slightly remaining in the wheel cylinders 23 is completely drained through the regulator cut valve 65 and the master cut valve 64, and then the remaining pressure in the wheel cylinders 23 becomes substantially zero.

The regulator cut valve 65 is opened before the master cut valve 64 is opened. This is because, if the remaining pressure is left in the wheel cylinders 23 at the time when the regulator cut valve 65 is opened and then brake fluid flows into the regulator 33, the regulator 33 is located away from the brake pedal 24 as compared with the master cylinder 32, so the driver hardly experiences uncomfortable pedal feeling. However, the master cut valve 64 may be opened before the regulator cut valve 65 is opened.

Incidentally, the pressure-reducing linear control valve 67 is controlled so that electric current supplied to the pressure-reducing linear control valve 67 is controlled by the brake ECU 70 through pulse width modulation (PWM) control to adjust the opening degree thereof. In the PWM control, high-frequency switching noise is generated. The noise is hardly audible to an occupant of the vehicle because road noise is large when the vehicle is running. On the other hand, when the vehicle is stopped or running at an extremely low speed, road noise is small, so the high-frequency noise may be audible to the occupant. Particularly, while the pressure-reducing linear control valve 67 is open in the stage 1 of the above described termination specific control, there is a possibility that the occupant feels uncomfortable against noise generated when the pressure-reducing linear control valve 67 is opened.

On the other hand, the regulator cut valve 65 and the master cut valve 64 each are a normally open electromagnetic valve of which supplied electric current is on-off controlled. Thus, because supplied electric current is in an off state in the stages 2 and 3, almost no switching noise is generated. In addition, in the present embodiment, the regulator cut valve 65 and the master cut valve 64 each are an electromagnetic valve of which the flow rate at which brake fluid passes through the valve is lower with respect to the same hydraulic pressure than that of the pressure-reducing linear control valve 67. Generally, as the flow rate at which brake fluid passes through the valve reduces with respect to the same hydraulic pressure, noise caused by reducing pressure reduces. Thus, when the regulator cut valve 65 and the master cut valve 64 are used to reduce the wheel cylinder pressure, generated noise is smaller than that of the pressure-reducing linear control valve 67.

Then, in the present embodiment, the brake ECU 70 detects the vehicle state, and estimates the degree of influence of noise, caused by reduction in wheel cylinder pressure, on the vehicle on the basis of the detected vehicle state. Then, the brake ECU 70 selects any of the electromagnetic valves, that is, the pressure-reducing linear control valve 67, the regulator cut valve 65 and the master cut valve 64, to reduce the wheel cylinder pressure on the basis of the estimated result.

For example, the brake ECU 70 detects wheel speeds of four drive wheels at time t0, at which it is determined to turn off braking, from the wheel speed sensors 18 as the vehicle state, and then determines whether the maximum wheel speed (hereinafter, referred to as four wheel speed MAX) among the wheel speeds of the four drive wheels is lower than a predetermined reference wheel speed. Then, when the four wheel speed MAX is lower than the predetermined reference wheel speed, on the basis of the results detected by the control pressure sensor 73 and the stroke sensor 25, the brake ECU 70 compares the wheel cylinder pressure Pfr with a predetermined first reference hydraulic pressure Pb1 at the time when it is determined to turn off braking. The first reference hydraulic pressure Pb1 is a low hydraulic pressure of about 0.1 to 0.2 MPa. When the wheel cylinder pressure Pfr is lower than the first reference hydraulic pressure Pb1, the brake ECU 70 estimates that the degree of influence of noise on the vehicle is larger than a predetermined reference value. Then, the brake ECU 70 opens the regulator cut valve 65 and the master cut valve 64 (stages 2 and 3) without executing the stage 1 that the wheel cylinder pressure is reduced by the pressure-reducing linear control valve 67. By so doing, the brake fluid remaining in the wheel cylinders 23 is returned to the regulator 33 and the master cylinder 32 through the regulator cut valve 65 and the master cut valve 64, thus avoiding a situation that the remaining pressure is left in the wheel cylinders 23.

When the four wheel speed MAX is lower than the predetermined reference wheel speed, such as when the vehicle is stopped or the vehicle is running at an extremely low speed, the vehicle cabin is quieter than that during regular running. Therefore, noise is noticeable when the pressure-reducing linear control valve 67 is opened. In addition, when the hydraulic pressure applied to the wheel cylinders 23 is lower than the first reference hydraulic pressure Pb1, even when the regulator cut valve 65 and the master cut valve 64, each of which has a pressure reduction response characteristic poorer than that of the pressure-reducing linear control valve 67, are used to reduce the pressure, the influence of a drag, or the like, due to the remaining pressure in the wheel cylinders 23 is also small. Then, when the four wheel speed MAX is lower than the predetermined reference wheel speed and the wheel cylinder pressure Pfr is lower than the first reference hydraulic pressure Pb1, the brake ECU 70 estimates that the degree of influence of noise on the vehicle is larger than the predetermined reference value, and then the regulator cut valve 65 and the master cut valve 64, which generate less noise when opened or closed, are selected to reduce the pressure. Thus, comfort (quietness) in the vehicle cabin may be improved.

In addition, when the four wheel speed MAX at the time when it is determined to turn off braking is lower than the predetermined reference wheel speed and, in addition, the wheel cylinder pressure Pfr is higher than or equal to the first reference hydraulic pressure Pb1 and lower than a predetermined second reference hydraulic pressure Pb2, the brake ECU 70 similarly skips the stage 1 and then selects the regulator cut valve 65 and the master cut valve 64 to reduce the pressure. In this case, a pressure-reducing linear control valve termination specific extension flag is set at ON. When there is the remaining pressure that is relatively high so that the first reference hydraulic pressure Pb1≦wheel cylinder pressure Pfr<second reference hydraulic pressure Pb2, if the accelerator is operated while the remaining pressure is slowly drained through the regulator cut valve 65 and the master cut valve 64 (particularly, at a low temperature), this may cause a delay of start of running and acceleration. Thus, the pressure-reducing linear control valve termination specific extension flag is set at ON so as to be able to carry out termination specific control from the stage 1 where necessary.

Then, when actual operation of the accelerator is detected by an acceleration request detecting unit (not shown), the brake ECU 70 selects the pressure-reducing linear control valve 67 to execute termination specific control from the stage 1. When there is an acceleration request, for example, engine noise, or the like, increases. This masks noise generated when the pressure-reducing linear control valve 67 is opened or closed. Thus, in this case, by selecting the pressure-reducing linear control valve 67 of which the flow rate at which brake fluid passes through the valve is higher with respect to the same hydraulic pressure, it is possible to promptly reduce the remaining pressure as compared with the regulator cut valve 65 and the master cut valve 64. Hence, it is possible to quickly carry out, acceleration.

On the other hand, when the four wheel speed MAX at the time when it is determined to turn off braking is lower than the predetermined reference wheel speed and the wheel cylinder pressure Pfr is higher than or equal to the second reference hydraulic pressure Pb2, or when the four wheel speed MAX at the time when it is determined to turn off braking is higher than or equal to the predetermined reference wheel speed, the brake ECU 70 executes normal termination specific control in the sequence of stage 1, stage 2 and stage 3 as shown in FIG. 2. In this way, when the vehicle is still running or when the remaining pressure at the time when it is determined to turn off braking is high, by reducing the pressure through the pressure-reducing linear control valve 67 of which the flow rate at which brake fluid passes through the valve is higher with respect to the same hydraulic pressure than those of the regulator cut valve 65 and the master cut valve 64, the wheel cylinder pressure is responsively reduced. Thus, it is possible to suppress heating of the brake due to the remaining pressure.

With the above configuration, it is assumed that the remaining pressure of at most the second reference hydraulic pressure Pb2 is left at the time when termination specific control ends. This remaining pressure is drained through the regulator cut valve 65 and the master cut valve 64. At that time, there is a possibility that the remaining pressure is detected by the regulator pressure sensor 71 or the control pressure sensor 73 and then it is determined to turn on braking. If braking is turned on in the above situation, operation noise of the pressure-increasing linear control valve 66 is generated. Then, in order to prevent operation noise of the pressure-increasing linear control valve 66, the above described braking start determination reference hydraulic pressure is set at a hydraulic pressure that is higher than the second reference hydraulic pressure Pb2. By setting the braking start determination reference hydraulic pressure at a hydraulic pressure that is higher than the second reference hydraulic pressure Pb2, it is possible to prevent a situation that it is determined to turn on braking because of the remaining pressure in the wheel cylinders 23.

Figure 3A:
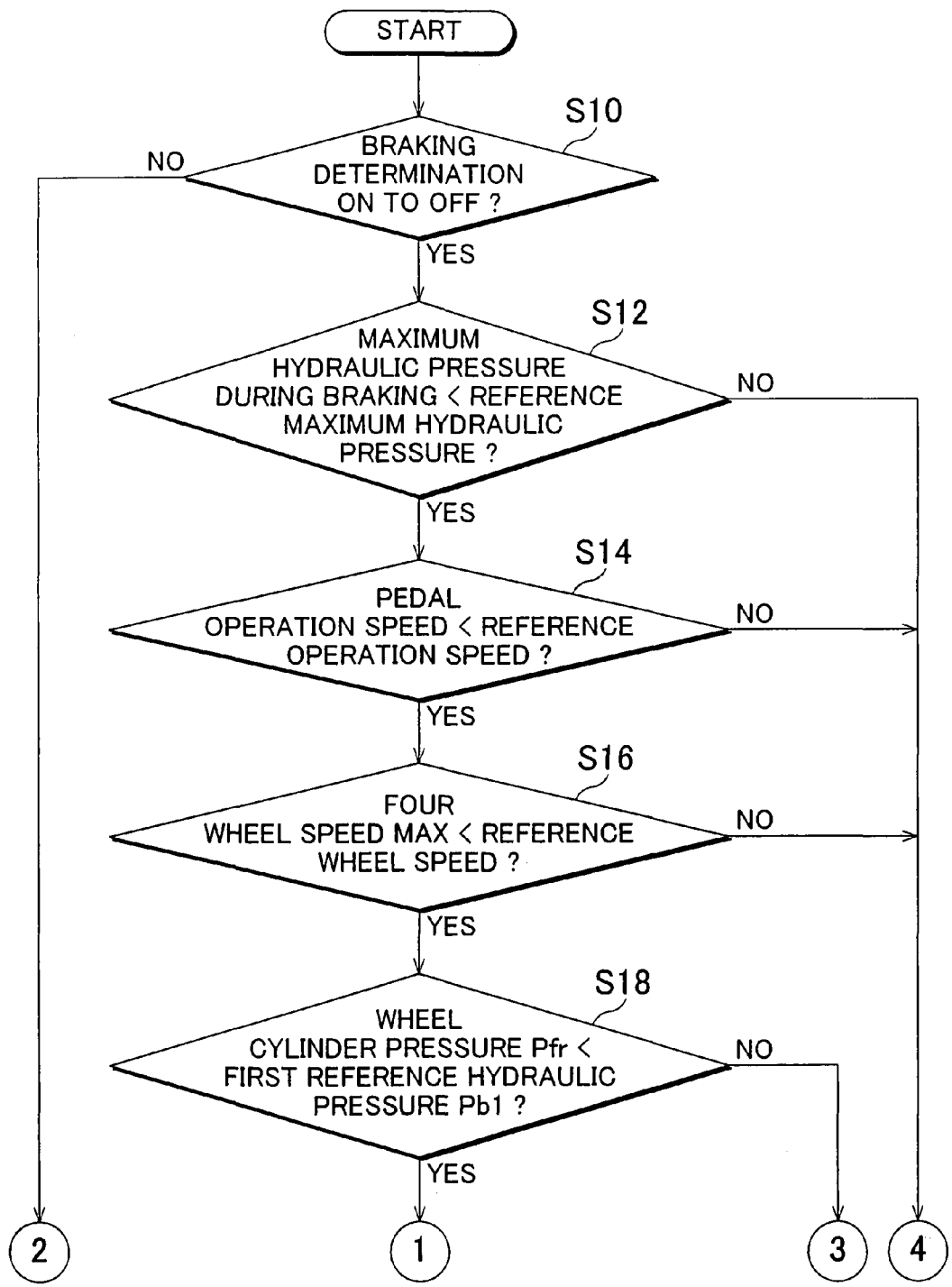
FIG. 3A is a flowchart that shows the flow of a termination specific control process according to the embodiment.
Figure 3B:
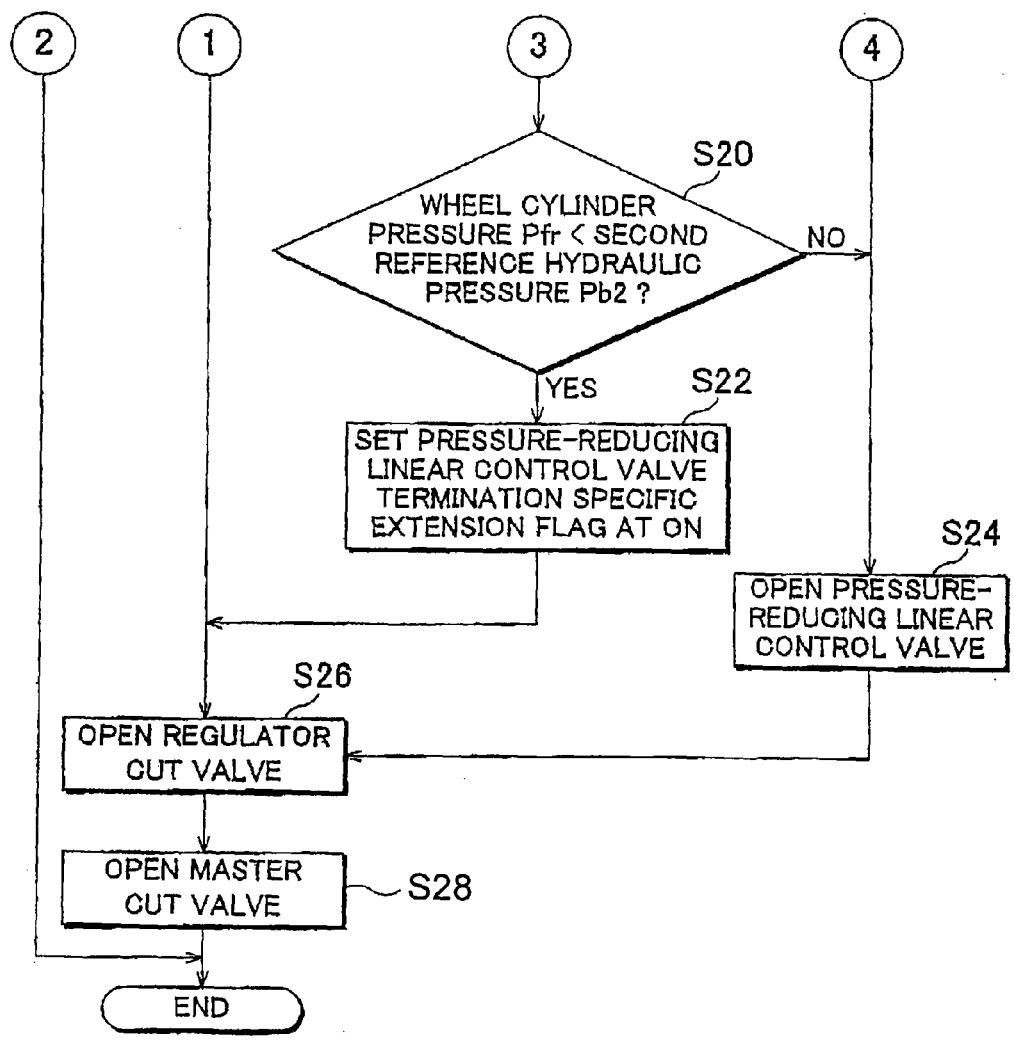
FIG. 3B is a continuation of the FIG. 3A flowchart.

FIGS. 3A and 3B are a flowchart that shows the flow of a termination specific control process according to the present embodiment. The process shown in FIGS. 3A and 3B is executed periodically at predetermined time intervals by the brake ECU 70 while braking determination is on.

First, the brake ECU 70 compares the regulator pressure from the regulator pressure sensor 71 with the predetermined braking start determination reference hydraulic pressure to determine whether braking determination is changed from on to off (S10). When the braking determination remains on (N in S10), the process ends.

When the braking determination is changed from on to off (Y in S10), the brake ECU 70 estimates the likelihood of the remaining pressure in the wheel cylinders 23 on the basis of the maximum hydraulic pressure of the wheel cylinder pressure Pfr, which is detected during braking and stored in a memory, and then determines, on the basis of the likelihood of the remaining pressure, whether the pressure is reduced through the pressure-reducing linear control valve 67. Specifically, it is determined whether the maximum hydraulic pressure of the wheel cylinder pressure Pfr during braking is lower than a predetermined reference maximum hydraulic pressure (S12). When the maximum hydraulic pressure during braking is higher than or equal to the reference maximum hydraulic pressure (N in S12), the pressure-reducing linear control valve 67 is opened (S24), and, subsequently, the regulator cut valve 65 and the master cut valve 64 are opened in the stated order (S26 and S28), thus executing termination specific control.

When the pressure is reduced from a state where the hydraulic pressure in the wheel cylinders 23 is low, it is less likely that the remaining pressure will be left in the wheel cylinders 23. Thus, the regulator cut valve 65 and the master cut valve 64 are preferentially opened to suppress noise. On the other hand, when the pressure is reduced from a state where the hydraulic pressure in the wheel cylinders 23 is high, it is highly likely that the remaining pressure will be left in the wheel cylinder 23. Thus, the pressure-reducing linear control valve 67 is selected and opened to quickly reduce the remaining pressure. In this way, by selecting the electromagnetic valves for reducing the pressure on the basis of the estimated likelihood of the remaining pressure, it is possible to quickly reduce the remaining pressure in the wheel cylinders 23.

When the maximum hydraulic pressure during braking is lower than the reference maximum hydraulic pressure (Y in S12), the brake ECU 70 detects the operation speed, at which the brake pedal 24 is operated, on the basis of information from the stroke sensor 25, and then compares the operation speed of the brake pedal 24 with a predetermined reference operation speed (S14). When the operation speed of the brake pedal 24 is higher than or equal to the reference operation speed (N in S14), the brake ECU 70 opens the pressure-reducing linear control valve 67 (S24), and then opens the regulator cut valve 65 and the master cut valve 64 in the stated order (S26 and S28) to execute termination specific control.

When the speed, at which the brake pedal 24 is returned, is low at the time when the wheel cylinder pressure is reduced, it is less likely that the remaining pressure will be left. Thus, the regulator cut valve 65 and the master cut valve 64 are preferentially selected to suppress noise. On the other hand, because a period of time until braking is stopped is short when the speed, at which the brake pedal 24 is returned, is high, it is likely that the remaining pressure will be left even when the pressure is reduced from a state where the hydraulic pressure in the wheel cylinders 23 is low. Thus, in this case, the pressure-reducing linear control valve 67 is selected to quickly reduce the remaining pressure. In this way, by selecting the electromagnetic valves for reducing the pressure on the basis of the speed at which the brake pedal 24 is operated, it is possible to quickly reduce the remaining pressure in the wheel cylinders 23.

When the speed, at which the brake pedal 24 is operated, is lower than the reference operation speed (Y in S14), the brake ECU 70 compares the four wheel speed MAX with the predetermined reference wheel speed (S16). When the four wheel speed MAX is higher than or equal to the reference wheel speed (N in S16), the pressure-reducing linear control valve 67 is opened (S24), and, subsequently, the regulator cut valve 65 and the master cut valve 64 are opened in the stated order (S26 and S28) to execute termination specific control.

On the other hand, when the four wheel speed MAX is lower than the predetermined reference wheel speed (Y in S16), the brake ECU 70 compares the wheel cylinder pressure Pfr at the time when it is determined to turn off braking with the predetermined first reference hydraulic pressure Pb1 on the basis of the results detected by the control pressure sensor 73 and the stroke sensor 25 (S18).

When the wheel cylinder pressure Pfr is lower than the first reference hydraulic pressure Pb1 (Y in S18), the brake ECU 70 skips the stage 1 in which the wheel cylinder pressure is reduced by the pressure-reducing linear control valve 67 and then opens the regulator cut valve 65 and the master cut valve 64 (S26 and S28) to execute termination specific control.

By so doing, the brake fluid remaining in the wheel cylinders 23 is returned to the regulator 33 and the master cylinder 32 through the regulator cut valve 65 and the master cut valve 64 to avoid a situation that the remaining pressure is left in the wheel cylinders 23. Because noise in the termination specific control is suppressed, it is possible to improve quietness in the vehicle cabin.

When the wheel cylinder pressure Pfr is higher than or equal to the first reference hydraulic pressure P131 (N in S18), the brake ECU 70 compares the wheel cylinder pressure Pfr with the predetermined second reference hydraulic pressure Pb2 (S20).

When the wheel cylinder pressure Pfr is higher than or equal to the second reference hydraulic pressure Pb2 (N in S20), the brake ECU 70 opens the pressure-reducing linear control valve 67 (S24), and, subsequently, opens the regulator cut valve 65 and the master cut valve 64 in the stated order (S26 and S28) to execute termination specific control.

When the wheel cylinder pressure Pfr is lower than the second reference hydraulic pressure Pb2 (Y in S20), the brake ECU 70 sets the pressure-reducing linear control valve termination specific extension flag at ON (S22). The pressure-reducing linear control valve termination specific extension flag is used in the process shown in FIG. 4. After that, the brake ECU 70 opens the regulator cut valve 65 and the master cut valve 64 (S26 and S28) in the stated order to execute termination specific control.

By so doing, brake fluid is returned to the regulator 33 and the master cylinder 32 through the regulator cut valve 65 and the master cut valve 64. This avoids a situation that the remaining pressure is left in the wheel cylinders 23, and suppresses noise in the termination specific control. Hence, it is possible to improve quietness in the vehicle cabin.

FIG. 4 is a flowchart that illustrates a process executed in parallel with the process shown in FIG. 3. The process shown in FIG. 4 is also periodically executed by the brake ECU 70 at predetermined time intervals.

First, the brake ECU 70 determines whether the pressure-reducing linear control valve termination specific extension flag is set at ON (S30). When the pressure-reducing linear control valve termination specific extension flag is not set at ON (N in S30), the process ends.

On the other hand, when the pressure-reducing linear control valve termination specific extension flag is set at ON (Y in S30), the brake ECU 70 determines whether the accelerator is depressed (S32). When the accelerator is released (N in S32), the process ends.

On the other hand, when the accelerator is depressed (Y in S32), the brake ECU 70 opens the pressure-reducing linear control valve 67 (S34), and, subsequently, opens the regulator cut valve 65 and the master cut valve 64 in the stated order (S36 and S38) to execute termination specific control.

In S26 and S28 of the flowchart shown in FIG. 3B, when the accelerator is operated while the remaining pressure is slowly drained through the regulator cut valve 65 and the master cut valve 64, this may cause a delay of start of running and acceleration. Then, in this way, when the pressure-reducing linear control valve termination specific extension flag is set at ON and the accelerator is depressed, the pressure is reduced through the pressure-reducing linear control valve 67 to execute termination specific control. Thus, the remaining pressure may be promptly reduced. This allows immediate acceleration by preventing a delay of start of running and acceleration. When there is an acceleration request, engine noise, or the like, increases, so noise generated when the pressure-reducing linear control valve 67 is opened or closed is not so annoying.

In the above embodiment, the control over the pressure-reducing linear control valve when the wheel cylinder pressure is reduced is described. The aspect of the invention may be applied to the pressure-increasing linear control valve or another switching valve.

While some embodiments of the invention have been illustrated above, it is to be understood that the invention is not limited to details of the illustrated embodiments, but may be embodied with various changes, modifications or improvements, which may occur to those skilled in the art, without departing from the scope of the invention.

The invention claimed is:

1. A brake controller that opens or closes a plurality of valves, which cause different noise when opened or closed and which are arranged in a circuit that supplies a hydraulic pressure to a wheel cylinder, so as to vary the hydraulic pressure, comprising:
    a vehicle state detecting portion that detects a state of a vehicle;
    an estimating portion that estimates a degree of influence of noise on the vehicle, generated in accordance with the variation in the hydraulic pressure, on the basis of the detected state of the vehicle; and
    a selecting portion that selects the valve to be opened or closed from among the plurality of valves on the basis of the estimated degree of influence of noise on the vehicle, wherein the vehicle state detecting portion includes a vehicle speed detecting portion that detects a vehicle speed, and the estimating portion estimates the degree of influence of noise on the vehicle on the basis of the detected vehicle speed, wherein the plurality of valves include a first valve and a second valve, wherein noise generated by opening or closing the second valve is smaller than that of the first valve, and the valve selected by the selecting portion is the second valve when the degree of influence of noise on the vehicle, estimated by the estimating portion, is larger than a predetermined reference value.

2. The brake controller according to claim 1, wherein the vehicle state detecting portion detects a vehicle speed; when the vehicle speed detected by the vehicle speed detecting portion is lower than a predetermined reference speed, the estimating portion estimates that the degree of influence of noise on the vehicle is larger than a predetermined reference value.

3. The brake controller according to claim 1, wherein the second valve is a valve of which a flow rate at which brake fluid passes through the fully open valve is lower with respect to the same hydraulic pressure than that of the fully open first valve.

4. The brake controller according to claim 3, wherein the vehicle state detecting portion includes a hydraulic pressure detecting portion that detects a hydraulic pressure applied to the wheel cylinder and an operation detecting portion that detects an operation state of a brake operating member by a driver, and the selecting portion compares the hydraulic pressure applied to the wheel cylinder at the time when braking of the vehicle ends in accordance with the detected hydraulic pressure applied to the wheel cylinder and the detected operation state of the brake operating member with a predetermined first reference hydraulic pressure, and then selects at least one of the first and second valves to be opened or closed on the basis of the compared result.

5. The brake controller according to claim 4, wherein the valve selected by the selecting portion is the first valve when the hydraulic pressure applied to the wheel cylinder is higher than a predetermined second reference hydraulic pressure that is higher than the first reference hydraulic pressure.

6. The brake controller according to claim 5, further comprising:

a braking start determination hydraulic pressure detecting portion that detects a braking start determination reference hydraulic pressure based on which it is determined whether braking of the vehicle is started; and a braking start determination portion that determines whether braking of the vehicle is started by comparing the detected braking start determination reference hydraulic pressure with a predetermined braking start determination reference hydraulic pressure, wherein the braking start determination reference hydraulic pressure is higher than the second reference hydraulic pressure, and when the braking that is determined to be started ends, the selecting portion selects at least one of the first and second valves to be opened or closed.

7. The brake controller according to claim 3, further comprising:

an acceleration request detecting portion that detects an acceleration request for the vehicle, wherein the selecting portion selects the first valve when the acceleration request detecting portion detects the acceleration request.

8. The brake controller according to claim 1, further comprising:

a maximum hydraulic pressure detecting portion that detects a maximum value of the hydraulic pressure applied to the wheel cylinder during braking; and a remaining pressure estimating portion that estimates a likelihood of remaining pressure in the wheel cylinder on the basis of the result detected by the maximum hydraulic pressure detecting portion, wherein the selecting portion selects the valve to be opened or closed on the basis of the likelihood of remaining pressure estimated by the remaining pressure estimating portion.

9. The brake controller according to claim 1, further comprising:

an operation speed detecting portion that detects an operation speed at which a brake operating member is operated, wherein the selecting portion selects the valve to be opened or closed by comparing the operation speed with a predetermined reference operation speed to select the valve to be opened or closed.

10. A brake control system comprising:

a first wheel cylinder that applies a braking force to a first drive wheel;

a second wheel cylinder that applies a braking force to a second drive wheel that is different from the first drive wheel;

a power hydraulic pressure source that is able to increase a hydraulic pressure by being supplied with power;

a master cylinder that supplies brake fluid to the first wheel cylinder through a master flow passage in accordance with an operation amount by which a brake operating member is operated;

a regulator that supplies brake fluid to the second wheel cylinder through a regulator flow passage in accordance with the operation amount by which the brake operating member is operated;

a master cut valve that is a normally open electromagnetic valve provided in the master flow passage;

a regulator cut valve that is a normally open electromagnetic valve provided in the regulator flow passage;

a power hydraulic pressure source flow passage that provides fluid communication between the first and second wheel cylinders and the power hydraulic pressure source;

a pressure-increasing linear control valve that is a normally closed electromagnetic valve provided in the power hydraulic pressure source flow passage and that increases a hydraulic pressure applied to the first and second wheel cylinders by adjusting an opening degree of the pressure-increasing linear control valve;

a pressure-reducing linear control valve that is a normally closed electromagnetic valve provided in the power hydraulic pressure source flow passage and that reduces the hydraulic pressure applied to the first and second wheel cylinders by adjusting an opening degree of the pressure-reducing linear control valve; and an electric current control unit that controls supply of electric current for driving the master cut valve, the regulator cut valve, the pressure-increasing linear control valve and the pressure-reducing linear control valve, wherein any one of the master cut valve and the regulator cut valve causes less noise when opened or closed than any one of the pressure-increasing linear control valve and the pressure-reducing linear control valve when opened or closed, and when a depression of the brake member is released and a vehicle speed is lower than or equal to a predetermined reference speed, the electric current control unit prohibits adjustment of the opening degree of the pressure-increasing linear control valve or the opening degree of the pressure-reducing linear control valve, and controls the supply of electric current so that brake fluid of the first and second wheel cylinders is returned to the regulator or the master varied by adjusting an opening degree of the regulator cut valve or an opening degree of the master cut valve.

11. A brake control method for a vehicle, comprising:

opening or closing a first valve and a second valve, the first and second valves driven by electric currents which generate noise, the first and second valves arranged in a circuit that supplies a hydraulic pressure to a wheel cylinder, so as to vary the hydraulic pressure, detecting with a hardware processor a state of the vehicle and estimating a degree of influence of noise caused by driving the first and second valves on the basis of the detected vehicle state, when the hydraulic pressure is lower than a predetermined value and a rotational speed of a drive wheel that is braked with an increase in the hydraulic pressure is lower than or equal to a predetermined reference speed, prohibiting the first valve from opening or closing, and opening or closing the second valve, wherein noise generated by the electric current driving the first valve when only the first valve out of the first valve and the second valve is opened or closed is larger than noise generated by the electric current driving the second valve when only the second valve out of the first valve and the second valve is opened or closed, and a rate of change in the hydraulic pressure when only the first valve out of the first valve and the second valve is fully opened or closed is higher than a rate of change in the hydraulic pressure when only the second valve out of the first valve and the second valve is fully opened or closed.

12. The brake control method according to claim 11, wherein the first valve is an electromagnetically driven valve that is driven by an electric current supplied thereto through PWM control, and the second valve is an electromagnetically driven valve that is driven by an electric current supplied thereto through on-off control.

13. A brake controller that opens or closes a plurality of valves, which cause different noise when opened or closed and which are arranged in a circuit that supplies a hydraulic pressure to a wheel cylinder, so as to vary the hydraulic pressure, comprising:

a vehicle state detecting portion that detects a state of a vehicle;

an estimating portion that estimates a degree of influence of noise on the vehicle, generated in accordance with the variation in the hydraulic pressure, on the basis of the detected state of the vehicle; and a selecting portion that selects the valve to be opened or closed from among the plurality of valves on the basis of the estimated degree of influence of noise on the vehicle, a remaining pressure estimating portion that estimates a likelihood of remaining pressure in the wheel cylinder, wherein the vehicle state detecting portion includes a vehicle speed detecting portion that detects a vehicle speed, the estimating portion estimates the degree of influence of noise on the vehicle on the basis of the detected vehicle speed, and the selecting portion selects a prohibiting valve from opening or closing on the basis of a degree of influence of noise on the vehicle estimated by the estimating portion and permits the prohibiting valve to be opened or closed on the basis of the likelihood of remaining pressure estimated by the remaining pressure estimating portion.

* * * * *